(12) United States Patent
Huang

(10) Patent No.: US 12,307,793 B2
(45) Date of Patent: May 20, 2025

(54) IMAGE INFORMATION TRANSFORMATION METHOD, IMAGE INFORMATION OUTPUTTING METHOD, IMAGE ANALYSIS DEVICE

(71) Applicant: VIVOTEK INC., New Taipei (TW)

(72) Inventor: Chao-Tan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 160 days.

(21) Appl. No.: 18/216,614

(22) Filed: Jun. 30, 2023

(65) Prior Publication Data

US 2024/0046667 A1    Feb. 8, 2024

(30) Foreign Application Priority Data

Aug. 2, 2022  (TW) .................................. 111128895

(51) Int. Cl.
| | |
|---|---|
| *G06V 20/62* | (2022.01) |
| *G06T 7/62* | (2017.01) |
| *G06V 10/44* | (2022.01) |
| *G06V 10/56* | (2022.01) |
| *G06V 20/52* | (2022.01) |

(52) U.S. Cl.
CPC .............. *G06V 20/625* (2022.01); *G06T 7/62* (2017.01); *G06V 10/44* (2022.01); *G06V 10/56* (2022.01); *G06V 20/52* (2022.01)

(58) Field of Classification Search
CPC ..................................................... G06V 20/625
USPC .......................................................... 348/148
See application file for complete search history.

(56) References Cited

U.S. PATENT DOCUMENTS

2014/0254877 A1*  9/2014  Jankowski ............. G08G 1/017
                                                                       382/105

FOREIGN PATENT DOCUMENTS

| CN | 104486083 A | 4/2015 |
|---|---|---|
| CN | 108206930 A | 6/2018 |
| CN | 111770242 A | 10/2020 |

* cited by examiner

*Primary Examiner* — Jeffery A Williams
(74) *Attorney, Agent, or Firm* — Winston Hsu

(57) ABSTRACT

An image information transformation method is applied to an image analysis device with an operation processor and includes generating a false object datum in a predefined manner, and deciding whether to output the false object datum in accordance with an identification result of a user license.

20 Claims, 3 Drawing Sheets

IMAGE INFORMATION TRANSFORMATION METHOD, IMAGE INFORMATION OUTPUTTING METHOD, IMAGE ANALYSIS DEVICE

BACKGROUND OF THE INVENTION

1. Field of the Invention

The present invention relates to an image information transformation and outputting method and an image analysis device, and more particularly, to an image information transformation and outputting method and an image analysis device of providing a smart surveillance function in accordance with a license identification result.

2. Description of the Prior Art

A conventional surveillance apparatus has multiple levels of smart surveillance functions, and provides a smart surveillance result in accordance with authority level of the input license, for being watched by the license owner. For example, if the surveillance apparatus reads the input license of the junior security, the real-time surveillance images can be displayed on the display screen; if the surveillance apparatus reads the input license of the senior security, the smart surveillance functions of video fast forward and playback are optionally provided; if the surveillance apparatus reads the input license of the security officer, the advanced search and identification functions are provided accordingly. Therefore, design of an image information transformation and outputting method of adjusting image analysis content in accordance with the license identification result to provide novel experience and enhance product competition is an important issue in the related surveillance industry.

SUMMARY OF THE INVENTION

The present invention provides an image information transformation and outputting method and an image analysis device of providing a smart surveillance function in accordance with a license identification result for solving above drawbacks.

According to the claimed invention, an image information transformation method applied to an image analysis device having an operation processor is disclosed. The image information transformation method includes generating a false object datum in a predefined manner, and deciding to output the false object datum in accordance with an identification result of a user license.

According to the claimed invention, an image information outputting method applied to an image analysis device having an image receiver and an operation processor is disclosed. The image information outputting method includes acquiring a surveillance image via the image receiver, analyzing the surveillance image to generate a false object datum in a predefined manner, and deciding to output the false object datum in accordance with an identification result of a user license.

According to the claimed invention, an image analysis device includes an image receiver and an operation processor. The image receiver is adapted to acquire a surveillance image. The operation processor is electrically connected with the image receiver in a wire manner or in a wireless manner, and adapted to generate a false object datum in a predefined manner via an analysis result of the surveillance image, and decide to output the false object datum in accordance with an identification result of a user license.

The image information processing program and the image analysis device of the present invention can analyze the real object datum inside the surveillance image to generate the false object datum. The attribute, the behavior, the event, existence and any features of the real object datum can be adjusted for generating the false object datum. The size of the false object datum can be set in accordance with the size of the real object datum. Three dimensional information of the real object datum can be used to establish a three dimensional model of the false object datum, and then a reasonable two dimensional marking frame of the false object datum can be generated in accordance with an imaging angle of the surveillance image; application of transforming the real object datum into the false object datum is not limited to the foresaid embodiments. Some features of the real object datum can be randomly selected and varied via a specific percentage for being corresponding features of the false object datum. The image information processing program and the image analysis device of the present invention can determine whether the user license belongs to the authorized license, and further decide whether to generate or display the false object datum in accordance with a determination result, so that the user can experience the related image information processing function according to the license level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
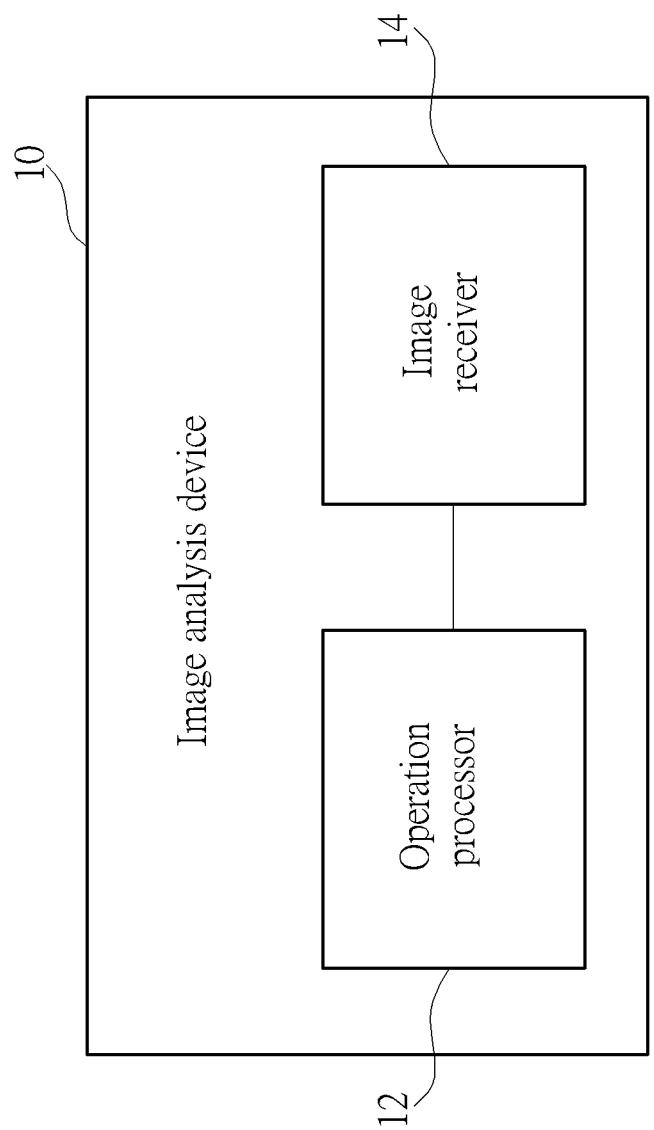
FIG. 1 is a functional block diagram of an image analysis device according to an embodiment of the present invention.
Figure 2:
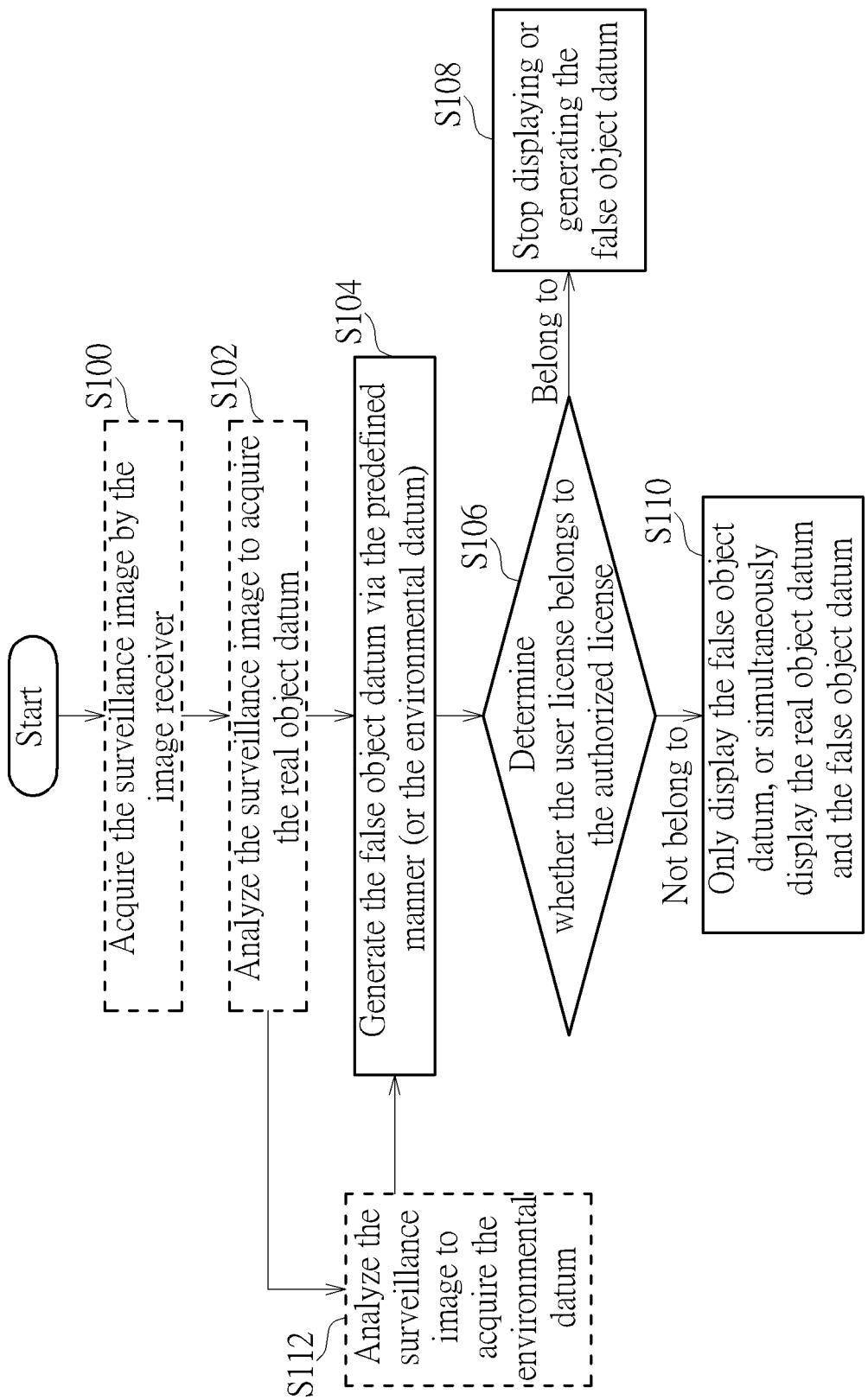
FIG. 2 is a flow chart of the image information processing program according to the embodiment of the present invention.

Please refer to FIG. 1 and FIG. 2. FIG. 1 is a functional block diagram of an image analysis device 10 according to an embodiment of the present invention. FIG. 2 is a flow chart of the image information processing program according to the embodiment of the present invention. The image analysis device 10 can at least include an operation processor 12, and further optionally include an image receiver 14. The image receiver 14 can capture a series of surveillance images. The operation processor 12 can analyze one or several surveillance images of the series of surveillance images, and transform image data within the surveillance image into another type via a specified condition, for being displayed on a display screen or other interface to be watched by the user. The operation processor 12 can be electrically connected with the image receiver 14 in a wire manner or in a wireless manner, and execute an image information processing program illustrated in FIG. 2.

If the image analysis device 10 only includes the operation processor 12, the operation processor 12 can execute an image information transformation method of the image information processing program to analyze and transform the existing surveillance image. The surveillance image can be sent from an external electronic device, or be stored in a built-in memory unit of the image analysis device 10; a source of the surveillance image can depend on a design demand. If the image analysis device 10 includes the operation processor 12 and the image receiver 14, the operation processor 12 can execute an image information outputting method of the image information processing program; the operation processor 12 can utilize the image receiver 14 to acquire the immediately capturing surveillance image or the existing surveillance image, and then analyze and transform the surveillance image from the image receiver 14 for being displayed on the display screen or transmitting to other electronic device.

Figure 3:
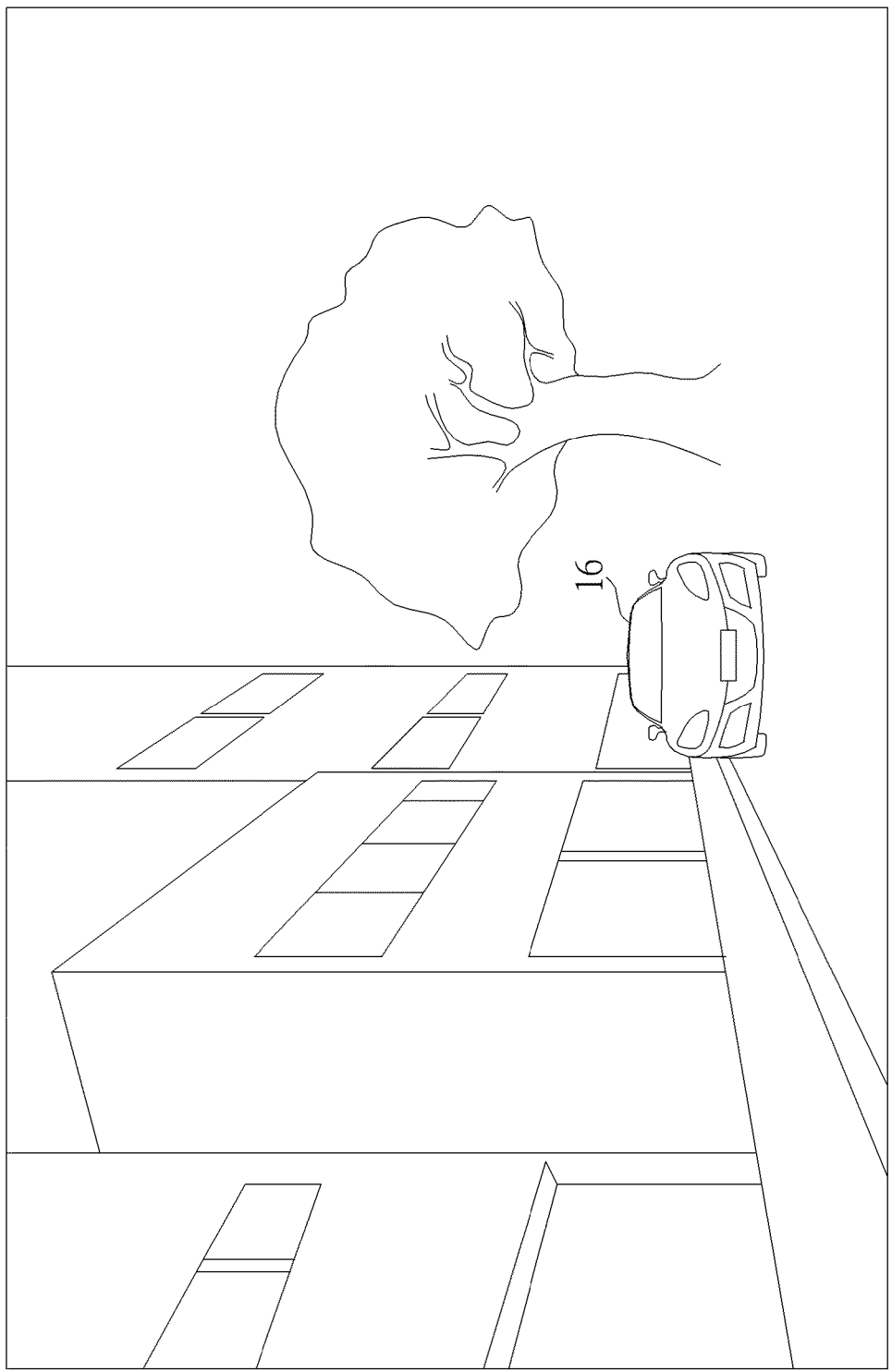
FIG. 3 is a diagram of the surveillance image processed by the image information processing program according to the embodiment of the present invention.

Please refer to FIG. 2 and FIG. 3. FIG. 3 is a diagram of the surveillance image I processed by the image information processing program according to the embodiment of the present invention. Regarding the image information processing program, step S100 can be optionally executed to acquire the surveillance image I by the image receiver 14, and then step S102 and step S104 can be executed to analyze the surveillance image I to acquire a real object datum, and transform the real object datum into a false object datum in a predefined manner. For example, a vehicle 16 inside the surveillance image I shown in FIG. 3 can be the real object datum; if the vehicle 16 is transformed into the false object datum, a number, a position, a color, a speed or any other features of the false object datum of the vehicle 16 can be different from corresponding features of the real object datum shown in FIG. 3. Besides, the image information processing program can directly generate the false object datum in the predefined manner without referring to the real object datum of the surveillance image I. Then, step S106 can be executed to read and determine a user license transmitted into the image analysis device 10

If the user license belongs to an authorized license, an owner of the user license has permission to see a correct analysis result of the image analysis device 10, and step S108 can be executed to stop displaying the false object datum on the display screen, or stop generating the false object datum. If the user license does not belong to the authorized license, the owner of the user license has no permission to see the correct or complete analysis result of the image analysis device 10, and step S110 can be executed to display the false object datum on the display screen, or simultaneously display the real object datum and the false object datum on the display screen. If the user license cannot be read in step S106, license information may not be input by the user and there is not identification result, so that step S110 can be executed accordingly in the image information processing program, which means a unlicensed person or an unauthorized license owner both cannot acquire the correct or complete analysis result of the image analysis device 10.

It should be mentioned that the image information processing program can choose to not analyze the surveillance image I, and directly transform the real object datum inside the surveillance image I into the false object datum in the predefined manner. For example, the image analysis device 10 can directly execute transformation of the false object datum in the predefined manner when receiving the surveillance image I. The predefined manner can be a historical object datum, a specific random algorithm or any other known conditions; application of the predefined manner will be illustrated in the following description. Besides, in another possible embodiment, the real object datum, the false object datum and a user-defined rule can be compared with each other to generate an event, which means the event can be generated in accordance with the real object datum or the false object datum. Moreover, the present invention can directly generate and output a false event in step S108 without referring to the false object datum or the real object datum. Further, step S106 can be optionally executed with execution of step S100, step S102 or step S104; as long as an identification result of the user license can be obtained in advance, the identification result can be used to decide execution of step S104 or step S108 or step S110. For example, the image information processing program may acquire the identification result of the user license via step S106 before or after a point of time of acquiring the surveillance image in step S110, and store the identification result in the memory unit (which is not shown in the figures) of the image analysis device 10; when the real object datum is transformed into the false object datum via step S104, the identification result in step S106 can be used to decide whether to generate the false object datum and further decide an outputting process of the false object datum.

As the embodiment shown in FIG. 3, the vehicle 16 inside the surveillance image I can be the real object datum, and the false object datum transformed by the vehicle 16 can belong to metadata. The false object datum may not be always displayed on the surveillance image I, and existed as a statistical result. If the user license belongs to the authorized license, the image information processing program only displays the real object datum of the vehicle 16 on the display screen, so the owner of the user license can watch the correct image information. If the user license does not belong to the authorized license, the image information processing program only displays the false object datum on the display screen, or simultaneously displays the real object datum and the false object datum on the display screen. For example, if the real object datum (such as the vehicle 16) is a stationary car, a condition of only displaying the false object datum can be interpreted as: the statistical result provides a moving car appeared inside the surveillance image I; another condition of simultaneously displaying the real object datum and the false object datum can be interpreted as: the statistical result provides the stationary car and the moving car appeared inside the surveillance image I. Therefore, the present invention can allow the unauthorized license owner to experience a part of analysis functions of the image analysis device 10, such as identifying the number and a state of the moving object inside the surveillance image I, an attribute of the moving object being the vehicle or a pedestrian, a type or the color of the vehicle, a gender or an age of the pedestrian, or any applicable features; however, the number or the position or some specific features of the moving object can be slightly changed, and the unauthorized license owner cannot acquire the correct and complete image information inside the surveillance image I by the image analysis device 10.

That is to say, the image information processing program of the present invention can change the attribute, the behavior or the event of the real object datum to generate the false object datum when receiving the real object datum. The attribute of the real object datum can include, but not be limited to, the coordinates, the color, the size and the category of the object; the coordinates can be indicated as position of the object inside the surveillance image I, the color can be indicated as appearance color or pattern of the object inside the surveillance image I, the size can be indicated as a scaling ratio of the object inside the surveillance image I, and the category can be indicated as a car type or a human race of the object inside the surveillance image I. The behavior of the real object datum can include, but not be limited to, a trace or an orientation of the object; the trace can be indicated as a moving path of the object inside the surveillance image I, and the orientation can be indicated as perspective change from a front side, a rear side or a lateral side of the object inside the surveillance image I. The event of the real object datum can include, but not be limited to, determination of whether the object enters or leaves a specific area, or whether the object is in an accelerating condition or in an over-speeding condition.

Besides, the image information processing program of the present invention can optionally execute step S112 to further analyze the surveillance image I for acquiring an environmental datum of the surveillance image I after the real object datum is acquired in step S102; accordingly, step S104 can transform the real object datum into the false object datum via the environmental datum in the predefined manner. As an example shown in FIG. 3, the environmental datum can be position or a size of the building or the tree, and the false object datum can be designed by referring to obstacle dodge of the environmental datum; for instance, the false object datum of the vehicle cannot be parked on the wall of the building or the leaf of the tree, so as to ensure that the false object datum or the related false behavior and the false event are reasonably transformed from the real object datum, and further prevent the unauthorized license owner from easily distinguishing the real object datum from the false object datum.

In step S104, the predefined manner can be a selection result of the random algorithm applied to a plurality of historical object data. The operation processor 12 may store object information detected in a past period, and can read the plurality of historical object data stored in the memory unit (which is not shown in the figures) when executing the image information processing program of the present invention, and then the random algorithm can be utilized to choose one of the plurality of historical object data for being set as the false object datum; for example, one of the plurality of historical object data can be randomly selected and its feature can be optionally adjusted for being set as the false object datum, or the historical object datum with highest or lowest appearance frequency can be selected from the plurality of historical object data and its feature can be optionally adjusted for being set as the false object datum. Further, the operation processor 12 can utilize the random algorithm to compute a computation value of the plurality of historical object data for being set as the false object datum; for example, N pieces of the historical object data can be randomly selected, and an average value of features of the selected historical object data can be set as features of the false object datum.

It should be mentioned that a transformation range of the real object datum relative to the false object datum can be decided by the environmental datum of the surveillance image I when the random algorithm is applied to transform the real object datum into the false object datum, so as to ensure the false object datum being reasonable, and further prevent the unauthorized license owner from easily distinguishing a difference between the real object datum and the false object datum. For example, if the random algorithm is applied to compute a coordinate average value of the plurality of historical object data, the coordinate average value is decided to not overlap with the obstacle, such as the building or the tree, inside the environmental datum, and the false object datum can be correctly appeared on the road inside the surveillance image I correctly. Further, if the random algorithm is applied to compute a color average value of the plurality of historical object data, the vehicle may be painted by black, white, red, blue or yellow colors, so that an upper limit value and a lower limit value of random adjustment can be set to ensure that the computed color average value can conform to a normal color.

Besides, the present invention can simplify object information transformation process in step S104, such as the predefined manner being only set as the specific random algorithm. The foresaid random algorithm can directly adjust one or several features of the real object datum to generate the false object datum. As shown in FIG. 3, the vehicle 16 can be the real object datum inside the surveillance image I, and the image information processing program of the present invention can directly change the state, the color and the coordinates of the vehicle 16 to generate the false object datum; for example, the vehicle 16 may be a yellow car parked in a parking space, and the false object datum can be set as a black car driving on the road. The related false object datum belongs to metadata and can be presented as the statistical result. Transformation from the real object datum to the false object datum is not limited to the above-mentioned embodiments, and depends on the design demand.

In addition, the present invention can change an existing point of time of the object information to execute the transformation between the real object datum and the false object datum. For example, if the image information processing program detects that the real object datum is existed in a specific point of time, and the user license does not belong to the authorized license, the object datum (which means the false object datum appeared at the wrong appearance point of time) can be displayed on the display screen after delaying a preset period at an appearance point of time (which means the foresaid specific point of time) of the real object datum; the size, the coordinates, the trace, the color and the category of the delay-displaying real object datum can be the same as features of the real-time detecting real object datum, the appearance point of time of the delay-displaying real object datum is the feature only changed in the surveillance image I, for an aim of not providing the correct or complete analysis result of the image analysis device 10 to the unauthorized license owner.

In addition to display the real object datum after delaying the preset period at the appearance point of time of the real object datum, the present invention can optionally shield or hide one or some real object datum appeared in the preset period, and then display the whole real object data previously hidden in the preset period at a preset point of time. That is to say, the image information processing program of the present invention may hide the real object datum respectively appeared at the appearance point of time at 3:00 p.m. and 4:00 p.m. and then display the real object datum appeared at the appearance point of time at 3:00 p.m. and 4:00 p.m. on the display screen respectively at 3:30 p.m. and 4:00 p.m., or display the real object datum appeared at the appearance point of time at 3:00 p.m. and 4:00 p.m. on the display screen both at 6:00 p.m. for being the false object datum.

In conclusion, the image information processing program and the image analysis device of the present invention can analyze the real object datum inside the surveillance image to generate the false object datum. The attribute, the behavior, the event, existence and any features of the real object datum can be adjusted for generating the false object datum. The size of the false object datum can be set in accordance with the size of the real object datum. Three dimensional information of the real object datum can be used to establish a three dimensional model of the false object datum, and then a reasonable two dimensional marking frame of the false object datum can be generated in accordance with an imaging angle of the surveillance image; application of transforming the real object datum into the false object datum is not limited to the foresaid embodiments. Some features of the real object datum can be randomly selected and varied via a specific percentage for being corresponding features of the false object datum. The image information processing program and the image analysis device of the present invention can determine whether the user license belongs to the authorized license, and further decide whether to generate or display the false object datum in accordance with a determination result, so that the user can experience the related image information processing function according to the license level.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image information transformation method applied to an image analysis device having an operation processor, the image information transformation method comprising:
   the operation processor analyzing a surveillance image to acquire a real object datum;
   the operation processor analyzing the surveillance image to acquire an environmental datum;
   the operation processor generating a false object datum in a predefined manner by utilizing the environmental datum to transform the real object datum into the false object datum; and
   the operation processor deciding to output the false object datum in accordance with an identification result of a user license;
   wherein the operation processor altering at least one feature of a coordinate, a color, a size, a category and a trace of the real object datum in response to a condition of conforming to the environmental datum so as to generate a false behavior and/or a false event of the false object datum.

2. The image information transformation method of claim 1, further comprising:
   the operation processor only outputting the false object datum or simultaneously outputting the real object datum and the false object datum when identifying the user license does not belong to an authorized license or having no identification result due to not reading the user license.

3. The image information transformation method of claim 1, further comprising:
   the operation processor stopping outputting the false object datum or stopping generating the false object datum when the user license belongs to an authorized license.

4. An image information transformation method applied to an image analysis device having an operation processor, the image information transformation method comprising:
   the operation processor generating a false object datum in a predefined manner; and
   the operation processor deciding to output the false object datum in accordance with an identification result of a user license;
   wherein the predefined manner utilizes a random algorithm to choose and set one of a plurality of historical object data as the false object datum, or utilizes the random algorithm to compute and set a computation value of the plurality of historical object data as the false object datum.

5. The image information transformation method of claim 4, wherein the random algorithm decides a transformation range of a real object datum relative to the false object datum in accordance with an environmental datum of the surveillance image.

6. The image information transformation method of claim 4, further comprising:
   the operation processor stopping outputting the false object datum or stopping generating the false object datum when the user license belongs to an authorized license.

7. An image information transformation method applied to an image analysis device having an operation processor, the image information transformation method comprising:
   the operation processor analyzing a surveillance image to acquire a real object datum;
   the operation processor generating a false object datum in a predefined manner by utilizing a random algorithm to adjust at least one feature of the real object datum for generating the false object datum; and
   the operation processor deciding to output the false object datum in accordance with an identification result of a user license.

8. The image information transformation method of claim 7, further comprising:
   the operation processor analyzing a surveillance image to acquire a real object datum;
   wherein the predefined manner altering at least one feature of a coordinate, a color, a size, a category and a trace of the real object datum to generate the false object datum.

9. The image information transformation method of claim 7, further comprising:
   the operation processor analyzing a surveillance image to acquire a real object datum; and
   the operation processor analyzing the surveillance image to acquire an environmental datum;
   wherein the predefined manner utilizes the environmental datum to transform the real object datum into the false object datum.

10. The image information transformation method of claim 7, further comprising:
    the operation processor analyzing a surveillance image to acquire a real object datum; and
    the operation processor only outputting the false object datum or simultaneously outputting the real object datum and the false object datum when identifying the user license does not belong to an authorized license or having no identification result due to not reading the user license.

11. The image information transformation method of claim 7, further comprising:
    the operation processor stopping outputting the false object datum or stopping generating the false object datum when the user license belongs to an authorized license.

12. An image information transformation method applied to an image analysis device having an operation processor, the image information transformation method comprising:
    the operation processor analyzing a surveillance image to acquire a real object datum;
    the operation processor outputting the real object datum after delaying a preset period at an appearance point of time of the real object datum for being a false object datum in a predefined manner; and the operation processor deciding to output the false object datum in accordance with an identification result of a user license.

13. The image information transformation method of claim 12, further comprising:

the operation processor analyzing a surveillance image to acquire a real object datum;

wherein the predefined manner altering at least one feature of a coordinate, a color, a size, a category and a trace of the real object datum to generate the false object datum.

14. The image information transformation method of claim 12, further comprising:

the operation processor analyzing a surveillance image to acquire a real object datum; and the operation processor analyzing the surveillance image to acquire an environmental datum;

wherein the predefined manner utilizes the environmental datum to transform the real object datum into the false object datum.

15. The image information transformation method of claim 12, further comprising:

the operation processor analyzing a surveillance image to acquire a real object datum; and the operation processor only outputting the false object datum or simultaneously outputting the real object datum and the false object datum when identifying the user license does not belong to an authorized license or having no identification result due to not reading the user license.

16. The image information transformation method of claim 12, further comprising:

the operation processor stopping outputting the false object datum or stopping generating the false object datum when the user license belongs to an authorized license.

17. An image information transformation method applied to an image analysis device having an operation processor, the image information transformation method comprising:

the operation processor analyzing a surveillance image to acquire a real object datum;

the operation processor shielding the real object datum appeared in a preset period, and displaying the real object datum shielded within the preset period at a preset point of time for being a false object datum in a predefined manner; and the operation processor deciding to output the false object datum in accordance with an identification result of a user license.

18. The image information transformation method of claim 17, further comprising:

the operation processor analyzing a surveillance image to acquire a real object datum;

wherein the predefined manner altering at least one feature of a coordinate, a color, a size, a category and a trace of the real object datum to generate the false object datum.

19. The image information transformation method of claim 17, further comprising:

the operation processor analyzing a surveillance image to acquire a real object datum; and the operation processor analyzing the surveillance image to acquire an environmental datum;

wherein the predefined manner utilizes the environmental datum to transform the real object datum into the false object datum.

20. The image information transformation method of claim 17, further comprising:

the operation processor stopping outputting the false object datum or stopping generating the false object datum when the user license belongs to an authorized license.

* * * * *